United States Patent [19]
Morgan et al.

[11] Patent Number: 5,665,463
[45] Date of Patent: *Sep. 9, 1997

[54] FIBROUS COMPOSITES INCLUDING MONAZITES AND XENOTIMES

[75] Inventors: Peter E. D. Morgan; David B. Marshall, both of Thousand Oaks, Calif.

[73] Assignee: Rockwell International Corporation, Thousand Oaks, Calif.

[*] Notice: The term of this patent shall not extend beyond the expiration date of Pat. No. 5,514,474.

[21] Appl. No.: 592,155

[22] Filed: Jan. 26, 1996

Related U.S. Application Data

[63] Continuation-in-part of Ser. No. 424,767, Apr. 19, 1995, Pat. No. 5,514,474, which is a continuation of Ser. No. 228,059, Apr. 15, 1994, abandoned.

[51] Int. Cl.$^6$ ........................................... B32B 7/00
[52] U.S. Cl. ..................... 442/103; 428/375; 428/379; 428/389; 428/688; 428/699; 428/701; 501/95.2; 501/126; 501/152; 442/178; 442/262; 442/318; 442/391
[58] Field of Search ................... 428/375, 379, 428/389, 688, 699, 701, 245, 260, 272, 273; 501/95, 152, 126

[56] References Cited

U.S. PATENT DOCUMENTS

| | | | |
|---|---|---|---|
| 4,837,230 | 6/1989 | Chen | 501/88 |
| 5,137,852 | 8/1992 | Morgan | 501/95 |
| 5,190,820 | 3/1993 | Millard | 428/378 |
| 5,202,175 | 4/1993 | Paz-pujalt | 428/142 |

OTHER PUBLICATIONS

P.E.D. Morgan and D.B. Marshall, "Functional Interfaces for Oxide/Oxide Composites," *J. Mat. Sci. Eng.*, A162, 15–25 (Apr. 30, 1993).

*Primary Examiner*—Ellis Robinson
*Assistant Examiner*—Timothy M. Speer

[57] ABSTRACT

Thermodynamically stable ceramic composites are provided for use in high temperature reactive environments. A phosphate selected from monazites and xenotimes functions as a weak bond material in the composite. Monazite comprises a family of minerals having the form $MPO_4$, where M is selected from the larger trivalent rare earth elements of the lanthanide series (La, Ce, Pr, Nd, Pm, Sm, Eu, Gd, and Tb) and coupled substituted divalents and tetravalents such as Ca or Sr with Zr or Th. Xenotimes are phosphates similar to monazite where M is selected from Sc, Y, and the smaller trivalent rare earth elements of the lanthanide series (Dy, Ho, Er, Tm, Yb, and Lu). High temperature ceramic composites that include monazite or xenotime and exhibit damage tolerant behavior or non-catastrophic fracture may be fabricated in a variety of material systems and reinforcement morphologies, including multilayered laminar composites; fiber, whisker, and particulate reinforced composites; hybrid laminar composites; and fabric or fiber preform composites. In preferred embodiments, the ceramic matrix comprises a material similar to the reinforcement to improve compatibility of the composite materials. The weak bond material allows debonding and "frictional" sliding between the constituents of the composite and inhibits crack growth across the interface.

20 Claims, 3 Drawing Sheets

FIBROUS COMPOSITES INCLUDING MONAZITES AND XENOTIMES

RELATED APPLICATIONS

This application is a continuation-in-part of application Ser. No. 08/424,767 filed Apr. 19, 1995, now U.S. Pat. No. 5,514,474 issued May 7, 1996, which is a continuation of application Ser. No. 08/228,059 filed Apr. 15, 1994, abandoned.

GOVERNMENT RIGHTS

The United States Government has rights in this invention under contract number N00014-91-C-0157 awarded by the Department of the Navy.

TECHNICAL FIELD

The present invention relates to ceramic composites and, in particular, to composites comprising a fibrous structure impregnated with a phosphate selected from monazites and xenotimes.

BACKGROUND OF THE INVENTION

A primary requirement for toughness in ceramic composites is the existence of a weak interface (or interphase) between constituents of the composite, such as between matrix and reinforcement materials. A weakly bonded interface allows sliding between the reinforcements and the matrix and/or preferential crack deflection around the reinforcements for optimal toughening of the composite. In fibrous composites the weak interface allows the matrix to crack and/or deform without damaging the fibers. In particulate composites clouds of microcracks can form around a large crack and disperse the rupture process. In multilayered composites the individual layers can fracture independently and disperse the rupture event to produce a non-catastrophic response.

An ideal interface between a reinforcement and a ceramic matrix must be sufficiently weak to allow debonding and sliding of the reinforcement when a crack impinges upon it from the matrix. If this does not occur, the crack passes through the reinforcement with minimal or no toughening of the composite. A relevant property of the interface is the debond energy, $\Gamma_i$, of either the interphase material or the actual interfaces between the reinforcement, interphase material, and matrix. The debonding criterion is generally satisfied if $\Gamma_i/\Gamma_f \leq 0.25$, where $\Gamma_f$ is the fracture energy of the reinforcement.

Ceramic composites are desirable in certain applications because of their refractory properties. For a high temperature composites, however, further requirements are imposed on the weak bond material: it must be weak and stable over the entire temperature range of use, chemically compatible with the other materials of the composite, and morphologically and environmentally stable at high temperatures. Existing fibrous and multilayered ceramic composites rely on carbon, boron nitride, or micaceous materials (e.g., fluorophlogopite) to provide the weak interface. Examples of these composites include various glasses, glass ceramics, silicon carbide, and silicon nitride reinforced with SiC or $Al_2O_3$ fibers; alumina, silicon nitride, or $MoSi_2$ reinforced with SiC whiskers; and multilayered laminates having layers of SiC and carbon. At higher temperatures, however, carbon and boron nitride interphase materials oxidize readily and micaceous materials react with reinforcement and matrix materials.

Machinable glass ceramics are another example of ceramic composites that rely on easy debonding. These composites contain platelets of a mica, such as fluorophlogopite, that cleave easily and cause chipping when the surface is contacted by a hard point. Because of this easy chipping, the material can be shaped using conventional metal working processes such as milling, drilling, and turning that remove material at a single contact site (rather than the more expensive and less versatile multipoint grinding that is needed for most ceramics).

Composites containing layers of interface materials selected from the β-alumina/magnetoplumbite family of structurally related materials have been developed for use in high temperature, oxidizing environments. These materials are described in U.S. Pat. No. 5,137,852 issued to Morgan et al., the teachings of which are incorporated herein by reference. Experimental work with these materials has shown, however, that it is difficult to find suitable composite systems comprising a ceramic matrix; reinforcements having high strength and high Young's modulus; and a weakly bonded interface material that is morphologically stable in high temperature oxidizing environments, chemically compatible with the matrix and fiber system, and a good match to the thermal expansion of the matrix and fibers. Because most suitable reinforcements and matrices are multiphase materials, the compatibility of the materials is reduced, particularly over a range of temperatures, and the complexity of chemical processing is increased. Thus, there is a need for high temperature ceramic composites that are less complex, have a weakly bonded interface between reinforcement and matrix materials, and are morphologically stable in high temperature reactive environments.

SUMMARY OF THE INVENTION

The present invention comprises a family of ceramic composite materials that include a monazite or xenotime and are stable in reactive (i.e., oxidizing or at least mildly reducing) environments at temperatures up to about 2000° C. Monazite or xenotime functions as a weak bond interphase material between the constituents of the composite. Monazite comprises a family of phosphates having the form $MPO_4$, where M is selected from the larger trivalent rare earth elements of the lanthanide series (generally La, Ce, Pr, Nd, Pm, Sm, Eu, Gd, and Tb) and coupled substituted divalents and tetravalents such as Ca or Sr with Zr or Th. Xenotimes are phosphates similar to monazite, where M is selected from Sc, Y, and the smaller trivalent rare earth elements of the lanthanide series (generally Dy, Ho, Er, Tm, Yb, and Lu). High temperature ceramic composites that include a monazite or xenotime and exhibit damage tolerant behavior or non-catastrophic fracture (i.e., toughness) can be fabricated in a variety of material systems and reinforcement morphologies, including multilayered laminar composites; fiber, whisker, and particulate reinforced composites; hybrid laminar composites; and fabric or fiber preform composites. Alumina fibers ($Al_2O_3$), as an example of a preferred reinforcement material, have a high Young's modulus and may be used in single crystal or polycrystalline form. In preferred embodiments, the ceramic matrix comprises a material similar to the reinforcement to improve compatibility of the composite materials. The interphase material allows debonding and "frictional" sliding between the constituents of the composite and inhibits crack growth across the interface.

An object of the invention is a fibrous composite having high temperature stability. A feature of the invention is a monazite or xenotime included as a matrix material in fibrous composites. An advantage of the invention is formation of a weak bond interface in fibrous composite materials that are morphologically stable in high temperature reactive environments.

BRIEF DESCRIPTION OF THE DRAWINGS

For a more complete understanding of the present invention and for further advantages thereof, the following Detailed Description of the Preferred Embodiments makes reference to the accompanying Drawings, in which.

DETAILED DESCRIPTION OF THE PREFERRED EMBODIMENTS

Figure 1:
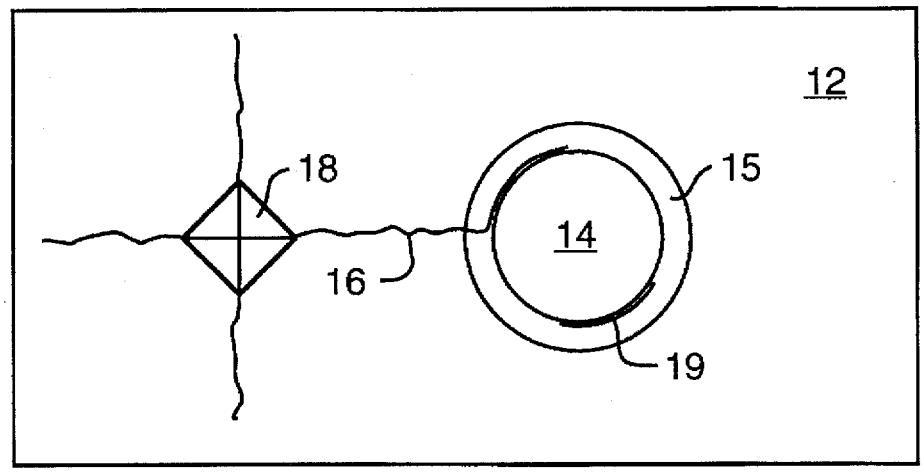
FIG. 1 is a schematic cross section showing crack deflection and debonding in a fiber reinforced ceramic composite of the present invention.

The present invention comprises a family of high temperature ceramic composites having a material that provides a weakly bonded interface between the constituents of the ceramic composite. The weak bond material, which is chosen for high temperature compatibility with the matrix and any reinforcement materials to provide a weakly bonded interface, is selected from the monazites and xenotimes. Monazite comprises a family of phosphates having the form $MPO_4$, where M is selected from the larger trivalent rare earth elements of the lanthanide series (generally La, Ce, Pr, Nd, Pm, Sm, Eu, Gd, and Tb) and coupled substituted divalents and tetravalents such as Ca or Sr with Zr or Th. Xenotimes are phosphates similar to monazite, where M is selected from Sc, Y, and the smaller trivalent rare earth elements of the lanthanide series (generally Dy, Ho, Er, Tm, Yb, and Lu). By way of example, the ceramic matrix material is generally selected from the group consisting of $Al_2O_3$, $MgAl_2O_4$, $ZrO_2$, YAG (yttrium aluminum garnet), monazites, xenotimes, mullite, cordierite, and mixtures of the foregoing. The reinforcement material is generally selected from the group consisting of $Al_2O_3$, $MgAl_2O_4$, $ZrO_2$, YAG, mullite, and mixtures of the foregoing, and may be in the form of fibers, whiskers, or particulates. The weak bond material allows "frictional" sliding between constituents of the ceramic composite and inhibits crack growth across the interface. $LaPO_4$, or La-monazite, is a preferred weak bond material in ceramic composites of the present invention because of its formation of a weak bond with other materials. Unfortunately, there are no known phase diagrams in the published literature involving monazite or xenotime and selected ceramic materials. This omission indicates an oversight of the community regarding the unexpected and useful ceramic properties of these phosphates. For example, $LaPO_4$ is a refractory material with no decomposition up to its melting point of $2072\pm20°$ C. In addition, $LaPO_4$ is not easily reduced—it survives hot pressing in graphite to 1400° C. when not in direct contact with the solid graphite. The coefficient of thermal expansion (CTE) of monazite has been measured at $9.7 \times 10^{-6} \pm 0.1 \times 10^{-6°}$ $C.^{-1}$ from room temperature to 1000° C. Monazite is non-toxic and insoluble in water and acids, which provides high temperature stability against stress corrosion in the humid atmosphere of combustion gases, for example.

High temperature ceramic composites that include a monazite or xenotime and exhibit damage tolerant behavior or non-catastrophic fracture can be fabricated in a variety of material systems and reinforcement morphologies, such as multilayered laminar composites; fiber, whisker, and particulate reinforced composites; hybrid laminar composites; and fibrous composites, such as those formed of fabrics (including woven, knitted, matted, and braided materials, for example) or fiber preforms (such as skeletal fibrous structures, for example). In the fibrous ceramic composites of the present invention, a fibrous material (such as a woven ceramic fiber material, for example) is infiltrated (or impregnated or permeated) with a phosphate matrix material, comprising monazite or xenotime, that acts as a high temperature "starch" to stiffen the fibrous material without embrittling it. Such fibrous composites may be used, for example, as high temperature dust traps (e.g., candle filters), thermal insulation, or thermal protection blankets. Previously known fibrous composites, such as those using mullite-silica-based fibers and silica-based matrices, may be unsatisfactory in high temperature environments due to reaction and bonding of the fibers and matrix, which causes embrittlement of the fibrous composite at temperatures higher than about 1100° C.

In the fibrous composites of the present invention, a monazite or xenotime material may be applied to the fiber preform or fabric as (for example) a solution, slurry, sol-gel, or other precursor that converts to the desired matrix material upon heating. The applied material infiltrates or impregnates the fiber tows or mesh of the preform or fabric and forms a matrix that may contain porosity. The material may be applied by dipping, for example, or by painting on one side of the fabric or preform and relying on the wicking action of the fibers for infiltration. The monazite or xenotime matrix produces a stiffening of the fiber preform or fabric without causing embrittlement at high temperatures. A filler material (such as aluminum oxide, mullite, or zirconia particulates, for example) may be added to the solution, slurry, sol-gel, or other precursor to modify the properties (such as density and stiffness, for example) of the matrix. Filler particles smaller than a critical size (depending on the size, shape, and form of the fibrous material) infiltrate between individual fibers along with the precursor material. Filler particles larger than the critical size do not infiltrate the fiber tows, but form a thicker layer of monazite or xenotime matrix with particle filler over the fabric or preform. Such a composite of matrix and filler material may be used to fill in the texture of the fabric or preform and produce a smooth surface. The unusual phase compatibility of monazites and xenotimes with many other ceramic materials provides an unusually large freedom of choice for specialized additives. A significant advantage of the composites of the present invention is that the matrix material (monazite or xenotime) does not weaken, react with, or bond strongly to the fibers comprising the fabric or preform over the entire usable temperature range of the composite.

The following descriptions and examples regarding LaPO$_4$ as a preferred weak bond material also apply, in general, to the entire monazite and xenotime family of phosphates when used in ceramic matrix composites of the present invention. A preferred embodiment of the present invention comprises a ceramic composite system based on alumina (Al$_2$O$_3$) and LaPO$_4$ that is stable in high temperature reactive environments. The bond between LaPO$_4$ and alumina is sufficiently weak to allow debonding, and the materials are compatible and morphologically stable in oxidizing and reducing atmospheres at temperatures up to about 2000° C. Other potential interphase materials for alumina composites, such as C, BN, or refractory metals Mo, Cr, W, and Pt, are not oxidation resistant and can cause degradation of the fibers. Tin dioxide (SnO$_2$) can be used to provide a diffusion barrier and a weak interface between alumina fibers and glass or alumina matrices, but it is not stable in reducing atmospheres and it reacts slightly with various glasses. Moreover, the high temperature capability of these other materials is generally inferior to that of the monazite and xenotime family of materials.

EXAMPLES

Initial compatibility tests of preferred embodiments indicate that although no reactions and no eutectic occur between Al$_2$O$_3$ and LaPO$_4$ at temperatures up to about 1750° C., there may be a small solid solubility of Al$_2$O$_3$ in LaPO$_4$ (barely discernible by x-ray diffraction). To ensure that this solid solution limit was exceeded, the LaPO$_4$ powder used to fabricate the composites in Examples 1 through 5 below was pre-reacted with a small amount of an alumina source by firing at 1100° C. with the addition of 1% by weight of AlOOH (Disperal® solution).

1. Composite with Sapphire Fibers and LaPO$_4$ Interphase

Sapphire fibers were coated with LaPO$_4$ by dipping reinforcing fibers, such as sapphire fibers, for example, into a slurry of LaPO$_4$ powder in iso-butanol. The coated fibers were embedded in α-Al$_2$O$_3$ powder and then placed in a graphite die and hot pressed at 1400° C. for 1 hour in a nitrogen atmosphere. Slices of the composite were cut and polished for testing. A schematic cross section of such a composite 10 is illustrated in FIG. 1, showing alumina matrix 12, reinforcing fiber 14, and LaPO$_4$ coating 15.

In the tests, both alumina matrix 12 and the LaPO$_4$ coating 15 were fully dense and no reactions between the LaPO$_4$ and matrix 12 or LaPO$_4$ and fibers 14 were observable by scanning electron microscopy. LaPO$_4$ coating 15 was continuous but not uniform—its thickness varied between approximately 1 μm and 20 μm, but the variation had no effect on the results. A Vickers indenter, a square based diamond pyramid used for testing hardness of materials (as gauged by the size of the square indentation area 18), was used to generate cracks 16 in ceramic composite 10 oriented normal to the surface and aligned along the diagonals of the contact area 18. Indentation cracks 16 generated by the Vickers indenter in Al$_2$O$_3$ matrix 12 always deflected at the interface of LaPO$_4$ coating 15 and fiber 14 as indicated in FIG. 1. Additional cracking occurred in LaPO$_4$ coating 15 in the region where the indentation crack impinged on the coating. Interfacial debonding 19 also occurred on the opposite side of fiber 14. Debonding 19 was isolated from the indentation crack 16 and was caused by the tensile residual stress field of the indentation.

The debonding and sliding characteristics of the interface coating 15 were tested by using a flat ended indenter to push on the end of fiber 14 in a thin slice (1 mm thickness) of composite 10 in which fiber 14 was oriented normal to the slice. This caused debonding of the entire interface followed by sliding of fiber 14 out of the hole. Examination of the newly exposed surfaces of pushed fiber 14 and the remaining hole by scanning electron microscopy indicated that the separation occurred exactly along the interface between LaPO$_4$ coating 15 and sapphire fiber 14. This test indicates that the Al$_2$O$_3$, LaPO$_4$, and sapphire composite system possesses the debonding and sliding characteristics needed for a tough composite.

Slices of composite 10 containing fibers 14 normal to the surface were polished then heated in air to various temperatures for various times to test the stability of the interface coating 15. After heating, the interfacial debonding was tested using the indentation cracking method described above. In all cases (the most severe being 1600° C. for 24 hours) the interfaces debonded when the indentation crack intersected them. After long heat treatments at temperatures up to 1400° C., there was no evidence of any reaction or change in interfacial morphology internally (except for some grain growth in the monazite to a grain size of ~5 to 10 μm) or on the exposed surface. After heat treatment at 1600° C. there were no changes internally (i.e., examination of surface after polishing off ~10 μm of the exposed surface). However, on the exposed surface there were plate-shaped β-alumina/magnetoplumbite grains formed at the interfaces between the alumina and the monazite (more so between the matrix and monazite than between the monazite and the fibers). These grains were a Mg-Ca-La-aluminate, which was apparently stabilized by Mg that originated from the matrix (the alumina powder used for the matrix contained 0.5% MgO as an additive to control grain growth). Such plate-shaped grains were not observed when a high purity alumina was used.

2. Composite with LaPO$_4$ Matrix and Sapphire Fiber Reinforcement

In a variation of the composite described above, sapphire fibers 14 were placed in a graphite die with LaPO$_4$ powder and hot pressed at 1300° C. for 1 hour in a nitrogen atmosphere. This produced a composite similar to that of FIG. 1, except that LaPO$_4$ formed the entire matrix instead of merely a coating around fibers 14. Sections of the composite were cut normal to the fiber direction using a diamond saw and polished with diamond powder to allow microstructural characterization and testing of fracture properties.

The LaPO$_4$ matrix was close to fully dense and no reaction with sapphire fibers 14 was observable by scanning electron microscopy. Several tests were done to assess the interfacial debond properties, including loading a Vickers indenter into the matrix near a fiber 14 as shown in FIG. 1. As described above, when a crack 16 intersected a sapphire fiber 14, crack 16 was deflected around the fiber-matrix interface, similar to that illustrated in FIG. 1, rather than passing into and through fiber 14.

Another test involved flexural loading of a thin slice of composite 10, containing fibers 14 oriented normal to the slice, until the slice fractured. Where the fracture intersected fibers 14 it deflected around the interface leaving clean separation of the fibers and matrix. These results show that the interface between LaPO$_4$ and sapphire has sufficiently low fracture energy for use in tough ceramic composites.

3. Multilayered Alumina and LaPO$_4$ Laminar Composite

Laminar composites of the present invention were fabricated using two colloidal methods. In both cases separate slurries of alumina (Sumitomo powder without Mg additive)

and LaPO$_4$ powders were prepared as follows: the powders were dispersed ultrasonically in water at pH 2 and NH$_4$NO$_3$ was added to 2M resulting in suspensions that coagulated and allowed particles to pack to high density. In one method the multilayered composite was formed by alternately adding measured amounts of the two suspensions to a cylindrical container and centrifuging the container between each addition. This formed uniform, alternating, densely packed layers of the two powders which, after drying, were sintered to full density by heating in air at 1600° C. for 2 hours. Specimens with various layer thicknesses (as small as approximately 2 μm) were prepared in this manner. In a second method, multilayered composites were formed by alternately vacuum slip casting measured amounts of the two suspensions to form a layered compact which was then surrounded by alumina powder and hot pressed in graphite dies at 1400° C. for one hour.

Figure 2:
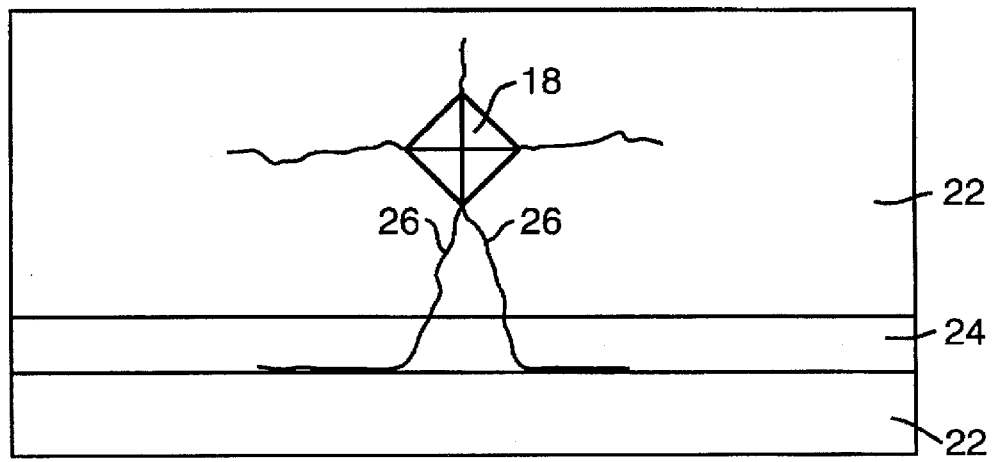
FIG. 2 is a schematic cross section showing crack deflection and debonding in layers of a ceramic composite of the present invention.

Interfacial debonding was tested on specimens with thick (>100 μm) Al$_2$O$_3$ layers 22 and thin (~2 to 20 μm) LaPO$_4$ layers 24 using Vickers indentations 18 placed near a thin layer 24 as shown in FIG. 2. Cracks 26 from indentation 18 were arrested by LaPO$_4$ layer 24, which debonded along the interface with the next layer of Al$_2$O$_3$.

Figure 3:
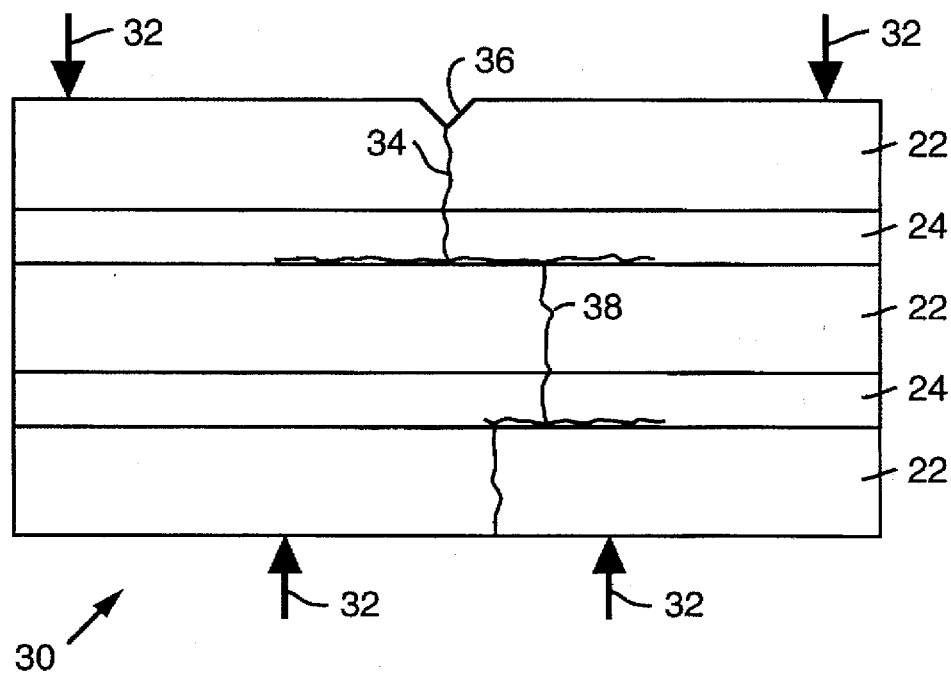
FIG. 3 is a schematic cross section showing crack propagation through multiple layers of a laminar ceramic composite of the present invention.

Interfacial debonding of a multilayer laminar composite 30 was tested by loading notched beams as indicated by arrows 32 in FIG. 3. Crack 34 that initiated from notch 36 in top Al$_2$O$_3$ layer 22 was arrested at the first LaPO$_4$ layer 24, which then debonded along the interface with the next Al$_2$O$_3$ layer 22. After increasing the applied load, a new crack 38 initiated independently in the next Al$_2$O$_3$ layer 22 and the sequence of crack growth, debonding, and new initiation repeated throughout the specimen as illustrated in FIG. 3.

Slices of composite 30 with polished surfaces were heat treated as in Example 1 above to test the stability of the LaPO$_4$ layers 24 and interfaces. The only changes detected after heat treatment at temperatures up to 1600° C. and times up to 24 hours were grain growth in both the alumina (grain size up to 50 μm) and monazite (grain size up to 20 μm). There were no signs of adverse reactions or changes in interface morphology (without Mg in the matrix, the β-alumina grains did not form on the exposed surface at 1600° C. as they did in Example 1 above).

4. Hybrid Laminar and Fibrous Composites

Figure 4:
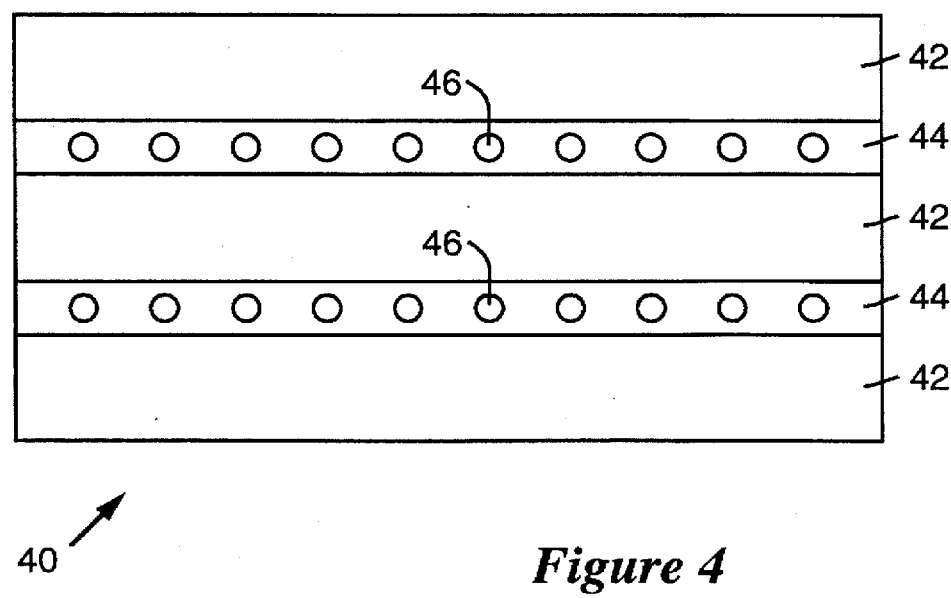
FIG. 4 is a schematic cross section showing a hybrid laminar ceramic composite of the present invention.

Hybrid laminar composites 40 consisting of polycrystalline alumina layers 42 alternating with LaPO$_4$ layers 44 reinforced with sapphire fibers 46, as shown in FIG. 4, were fabricated using the colloidal method described above in Example 3. LaPO$_4$ layers 44 were built in several steps using a vacuum slip casting method as follows: a thin layer 44 of LaPO$_4$ was deposited on top of a previous Al$_2$O$_3$ layer 42, fibers 46 were laid in place, and the remainder of LaPO$_4$ layer 44 was added. These steps were simply repeated to build up multilayer hybrid composite structure 40. The same tests as in Example 3 above were used to assess interfacial debonding, with similar results being obtained. In the notched beam tests an additional effect of debonding and pullout of the sapphire fibers within the LaPO$_4$ was observed. Such fiber pullout is expected to improve the toughness of laminar composites.

5. Particulate Composites

Particulate composites of the present invention were fabricated of LaPO$_4$ and Al$_2$O$_3$ using the following colloidal method: powder slurries of Al$_2$O$_3$ and LaPO$_4$ were prepared as described above in Example 3, then measured amounts of the two slurries were mixed together using ultrasonic agitation to achieve uniform mixing. Mixtures containing ratios 1:3, 1:1, and 3:1 of Al$_2$O$_3$:LaPO$_4$ by volume were prepared. Testing indicated that these particulate composites are machinable, and the Al$_2$O$_3$:LaPO$_4$ ratio can be optimized for specific end use applications.

6. Fibrous Composites

Figure 5:
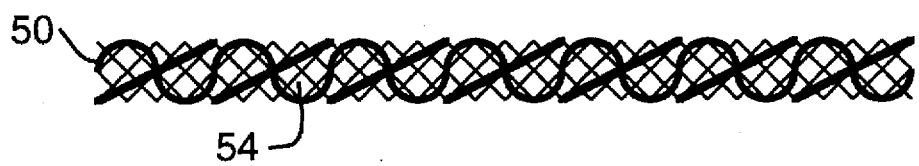
FIG. 5 is a schematic cross section showing a single layer fabric of the present invention infiltrated with a weak bond material.
Figure 6:
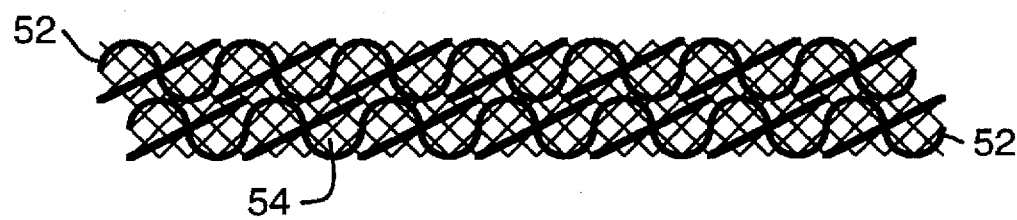
FIG. 6 is a schematic cross section showing a double layer fabric of the present invention infiltrated with a weak bond material.
Figure 7:
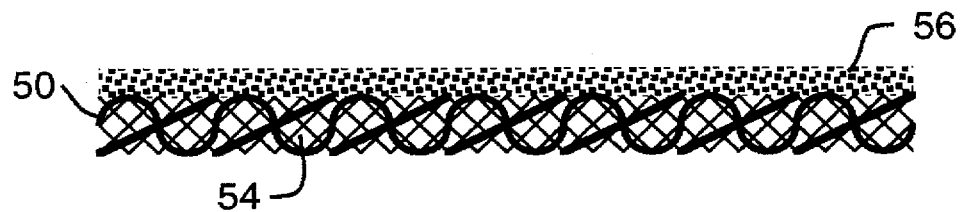
FIG. 7 is a schematic cross section showing a single layer fabric of the present invention infiltrated with a weak bond material having an additive forming a surface layer.

Fibrous composites of the present invention comprise fibrous materials (in any of various forms, including fabrics and preform structures) infiltrated with a monazite or xenotime. Typically, the fibrous material is impregnated with a precursor (e.g., a solution, slurry, or sol-gel) that converts to a monazite or xenotime when heated. In one experiment, two different fabrics 50 and 52, one comprising Al$_2$O$_3$ fibers and the other comprising mullite-silica fibers, as illustrated in FIGS. 5 and 6, were impregnated by dipping in several different clear aqueous precursor solutions, including one containing lanthanum nitrate and methylphosphonic acid and another containing lanthanum nitrate and phosphorous acid. These solutions contained lanthanum and phosphorus in the ratio of 1:1. Concentrations in the range of 1 to 2 moles per liter were found to be suitable, with the lower concentrations preferred for thinner coatings of La-monazite and the higher concentrations preferred for thicker coatings. Phytic acid, a natural food processing by-product, has also been used successfully as a precursor with lanthanum nitrate. The fabrics 50 and 52 were woven from fiber tows containing approximately 1000 fibers, each approximately 15 μm in diameter. Fabric 50 was woven in a single layer 8-harness satin weave, and fabric 52 was woven in a two-ply angle interlock. The precursor solutions were able to wet and infiltrate between individual fibers of the woven tows, as confirmed by scanning electron microscopy. After heating at about 1100° C. for an hour to form infiltration material 54, the existence of LaPO$_4$ (La-monazite) as material 54 was confirmed by X-ray diffraction.

The foregoing precursor solutions are described as examples, and not limitations, of the various precursors that can be used to impregnate the fibrous composites of the present invention. In general, suitable precursors include a source (such as a nitrate or other soluble anionic species, for example) of the base element of the desired monazite or xenotime combined with a source of phosphorus in a mixture (aqueous or non-aqueous) that can impregnate the fibrous structure and react (generally upon heating) to form a phosphate of the base element. Suitable sources of phosphorus include alkyl and aryl phosphonates (of which methylphosphonic acid is an example), phosphate esters (of which phytic acid is an example), other acids of phosphorus (including phosphorous acid, polyphosphoric acids, and well-known derivatives such as ammonium salts, for example), and soluble organic phosphorus compounds (including natural products rich in phosphate) that can be mixed in solution with the source of the base element of the desired monazite or xenotime. Some of these compounds, such as tributyl phosphate for example, are non-aqueous. Thus, one skilled in the art will recognize that suitable precursors include any mixtures that will deposit a monazite or xenotime (or precursor thereof, such as rhabdophane (hydrated lanthanum phosphate), for example) on a fiber, fabric, or fibrous preform.

It should be noted that monazites and xenotimes are nearly stoichiometric compounds, which is to say that the ratio of cation(s) to anionic species (such as La:P in the case of LaPO$_4$, for example) is essentially 1:1, with generally less than 1% deviation from this ratio. Therefore, if monazite or xenotime precursors are prepared with this ratio not precisely 1:1 (such as 1:1.01 or 1.01:1, for example), then other compounds will be formed along with the monazite or xenotime. In the case of composite systems with La-monazite (LaPO$_4$), for example, when phosphorus is in slight excess, LaP$_3$O$_9$ has been detected, and when lanthanum is in slight excess in the presence of alumina (Al$_2$O$_3$) fibers, LaAl$_{11}$O$_{18}$ has been detected. Both of these situations are undesirable because the fibrous materials can be attacked by the excess phosphorus or base element of the monazite or xenotime.

To alleviate the practical difficulty of attaining exactly a 1:1 ratio in precursor preparations, a suitable "buffer" material may be added. For example, in the La-monazite system, a buffer of about 1% aluminum nitrate may be added to a precursor solution having a La:P ratio of close to 1:1. The added Al undergoes the processing in a highly reactive and dispersed form so as to react with either excess phosphorus (to form AlPO$_4$, for example) or excess lanthanum (to form LaAl$_{11}$O$_{18}$, for example). Thus, the added buffer greatly reduces the chance of possibly deleterious reactions of the excess species with the fibrous material. In the case of composites with alumina fibers, a buffer comprising 1% Al is a natural choice, but it is anticipated that other suitable buffer materials can be used to aid in the process of attaining a good phase assemblage of fibrous composites without deleterious attack on the fibers, fabrics, or preforms.

The infiltrated fabrics 50 and 52 of the present invention were stiffened by the presence of the monazite matrix 54. The fabric composites could also be bent around a small radius of curvature (approximately 1 mm radius for the single layer cloth and approximately 2 mm radius for the double layer cloth), indicating that the fiber strength was not significantly degraded. Further heat treatment at temperatures up to 1200° C. and for periods up to 10 hours did not degrade the properties of the fabric composites.

The same fabrics of Al$_2$O$_3$ and mullite-silica fibers were also infiltrated and coated by brushing an aqueous solution containing lanthanum nitrate, phosphorous acid, and suspended, submicron, aluminum oxide particles (as an example of a ceramic filler material). The solution impregnated the fiber tows as before and, upon heating, formed a two-phase matrix of aluminum oxide particles in the lanthanum phosphate (La-monazite) 54 infiltrating and surrounding the individual fibers. If particles larger than about several microns are used, however, the particles remain substantially near the surface (i.e., do not significantly infiltrate the fiber tows or mesh) to form a surface layer 56 comprising a composite of alumina with monazite or xenotime.

Although the present invention has been described with respect to specific embodiments thereof, various changes, modifications, and substitutions may be suggested to one skilled in the art. Therefore, it is intended that the present invention encompass such changes and modifications as fall within the scope of the appended claims.

We claim:

1. A ceramic composite, comprising:
   a fibrous material forming a fibrous structure; and
   a weak bond material selected from the group consisting of monazites and xenotimes, said weak bond material infiltrating said fibrous structure and forming a weak bond with said fibrous material.

2. The ceramic composite of claim 1, wherein said fibrous material comprises a ceramic fiber material.

3. The ceramic composite of claim 2, wherein said fibrous material is selected from the group consisting of fibers of Al$_2$O$_3$, MgAl$_2$O$_4$, ZrO$_2$, yttrium aluminum garnet, mullite, and mixtures of the foregoing.

4. The ceramic composite of claim 1, wherein said fibrous structure has a form selected from the group consisting of woven fabrics, knitted fabrics, fiber mats, braided fibers, and fiber preforms.

5. The ceramic composite of claim 1, wherein said fibrous structure comprises a multilayer fabric.

6. The ceramic composite of claim 1, wherein said weak bond material comprises a reaction product of a precursor selected from the forms consisting of solutions, slurries, and sol-gels used to impregnate said fibrous structure.

7. The ceramic composite of claim 1, further comprising particles of a ceramic filler material in a matrix of said weak bond material.

8. The ceramic composite of claim 1, further comprising a two-phase layer on a surface of the ceramic composite, said two-phase layer comprising particles of a ceramic filler material in a matrix of said weak bond material.

9. A ceramic composite having high temperature stability, comprising:
   a multiplicity of ceramic fibers forming a fibrous structure; and
   a weak bond material infiltrating said fibrous structure and forming a weak bond with said ceramic fibers, said weak bond material selected from the group consisting of monazites and xenotimes.

10. The ceramic composite of claim 9, wherein said ceramic fibers are selected from the group consisting of Al$_2$O$_3$, MgAl$_2$O$_4$, ZrO$_2$, yttrium aluminum garnet, mullite, and mixtures of the foregoing.

11. The ceramic composite of claim 9, wherein said fibrous structure has a form selected from the group consisting of woven fabrics, knitted fabrics, fiber mats, braided fibers, and fiber preforms.

12. The ceramic composite of claim 9, wherein said fibrous structure comprises a multilayer woven fabric.

13. The ceramic composite of claim 9, wherein said weak bond material comprises a reaction product of a precursor selected from the forms consisting of solutions, slurries, and sol-gels, said precursor impregnating said fibrous structure and converting to said weak bond material upon heating.

14. The ceramic composite of claim 13, further comprising particles of a ceramic filler material in a matrix of said weak bond material.

15. The ceramic composite of claim 13, further comprising a two-phase layer on a surface of the ceramic composite, said two-phase layer comprising particles of a ceramic filler material in a matrix of said weak bond material.

16. A fibrous ceramic composite having high temperature stability, comprising:
   a multiplicity of ceramic fibers forming a fibrous structure having a form selected from the group consisting of woven fabrics, knitted fabrics, fiber mats, braided fibers, and fiber preforms; and
   a weak bond material comprising a reaction product of a precursor used to impregnate said fibrous structure, said weak bond material selected from the group of materials consisting of monazites and xenotimes that form a weak bond with said ceramic fibers.

17. The ceramic composite of claim 16, wherein said ceramic fibers are selected from the group consisting of Al$_2$O$_3$, MgAl$_2$O$_4$, ZrO$_2$, yttrium aluminum garnet, mullite, and mixtures of the foregoing.

18. The ceramic composite of claim 16, wherein said precursor is selected from the forms consisting of solutions, slurries, and sol-gels.

19. The ceramic composite of claim 18, wherein said precursor includes a particulate additive and is applied to said fibrous structure so that said additive infiltrates said fibrous structure as said precursor impregnates said fibrous structure.

20. The ceramic composite of claim 18, wherein said precursor includes a particulate additive and is applied to said fibrous structure so that said precursor impregnates said fibrous structure and said additive remains substantially on a surface of said fibrous structure.

* * * * *